US011394427B2

(12) United States Patent
Kasper et al.

(10) Patent No.: US 11,394,427 B2
(45) Date of Patent: Jul. 19, 2022

(54) INTERFACE DEVICE INTERFACING TRACTOR AND TOWED UNIT NETWORKS IN A COMBINATION VEHICLE

(71) Applicant: Bendix Commercial Vehicle Systems LLC, Elyria, OH (US)

(72) Inventors: Phillip J. Kasper, Elyria, OH (US); Daniel P. Zula, Elyria, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 114 days.

(21) Appl. No.: 16/803,500

(22) Filed: Feb. 27, 2020

(65) Prior Publication Data

US 2021/0273679 A1    Sep. 2, 2021

(51) Int. Cl.
*H04B 3/56* (2006.01)
*H04L 12/40* (2006.01)
(Continued)

(52) U.S. Cl.
CPC ............... *H04B 3/56* (2013.01); *H04L 12/40* (2013.01); *B60T 8/17616* (2013.01); *B60T 8/4072* (2013.01); *H04L 2012/40215* (2013.01)

(58) Field of Classification Search
CPC . H04B 3/56; H04L 12/40; H04L 2012/40215; B60T 8/17616; B60T 8/4072
(Continued)

(56) References Cited

U.S. PATENT DOCUMENTS

| 5,142,278 A | 8/1992 | Moallemi et al. |
| 5,739,592 A | 4/1998 | Rigsby et al. |
(Continued)

FOREIGN PATENT DOCUMENTS

| EP | 1013533 A1 | 6/2000 |
| EP | 1186510 A1 | 3/2002 |
(Continued)

OTHER PUBLICATIONS

Berg, "Second Connector Needed for Tractor-Trailer Communications?", Trailer Talk, Mar. 22, 2017. 4 pages.
(Continued)

*Primary Examiner* — Charles N Appiah
*Assistant Examiner* — Nicole M Louis-Fils
(74) *Attorney, Agent, or Firm* — Tucker Ellis LLP

(57) ABSTRACT

A device operatively couples a tractor ABS controller with TABS controllers in units towed by the tractor. A PLC interface circuit of the device communicates messages received from a PLC network of the towed units to a CAN network of the tractor via a CAN interface circuit. The device may also rebroadcast messages received from the PLC network back onto the PLC network, and may also wirelessly broadcast messages received from the PLC network back onto a wireless network. The device receives messages from the towed units at a message rate, determines a quantity of towed units from the message rate, and communicates the determined quantity of towed units on the CAN network of the tractor. The device receives messages indicating towed unit identification (ID) information, determines a quantity of towed units from the towed unit ID information, and communicates the determined quantity of towed units on the CAN network.

20 Claims, 6 Drawing Sheets

(51) Int. Cl.
*B60T 8/1761* (2006.01)
*B60T 8/40* (2006.01)

(58) Field of Classification Search
USPC .......................................................... 455/402
See application file for complete search history.

(56) References Cited

U.S. PATENT DOCUMENTS

| | | | |
|---|---|---|---|
| 6,127,939 | A | 10/2000 | Lesesky et al. |
| 6,545,593 | B2 | 4/2003 | DeWilde |
| 6,970,772 | B2 | 11/2005 | Radtke et al. |
| 7,415,325 | B2 | 8/2008 | Knosmann et al. |
| 7,760,077 | B2 | 7/2010 | Day |
| 9,409,510 | B1 | 8/2016 | Feagan |
| 9,499,109 | B2 | 11/2016 | Armacost et al. |
| 9,757,994 | B2 | 9/2017 | Patel et al. |
| 9,757,996 | B2 | 9/2017 | Uh et al. |
| 9,821,779 | B2 | 11/2017 | Grandstaff et al. |
| 2006/0235586 | A1 | 10/2006 | Waszkowski et al. |
| 2011/0281522 | A1* | 11/2011 | Suda ............... G06Q 10/0833 455/41.2 |
| 2013/0148748 | A1 | 6/2013 | Suda |
| 2015/0349977 | A1* | 12/2015 | Risse .................... H04B 3/542 701/36 |
| 2016/0207367 | A1* | 7/2016 | Zula ..................... B60C 23/009 |
| 2017/0106757 | A1 | 4/2017 | Weed et al. |
| 2017/0287320 | A1 | 10/2017 | Meade et al. |
| 2020/0282965 | A1* | 9/2020 | Pieronek ............... B60T 8/248 |
| 2020/0412574 | A1* | 12/2020 | Haslam ............. G01C 21/3469 |

FOREIGN PATENT DOCUMENTS

| | | | |
|---|---|---|---|
| EP | 1538040 | A2 | 6/2005 |
| EP | 1717068 | A2 | 9/2007 |
| EP | 2923864 | A1 | 9/2015 |
| WO | 1990013183 | A1 | 11/1990 |
| WO | 1993026062 | A1 | 12/1993 |
| WO | 1994012962 | A1 | 6/1994 |
| WO | 2011142852 | A1 | 11/2011 |
| WO | 2013022576 | A1 | 2/2013 |
| WO | 2013086517 | A1 | 6/2013 |
| WO | 2013124730 | A1 | 8/2013 |
| WO | 2014012609 | A1 | 1/2014 |
| WO | 2014086449 | A1 | 6/2014 |
| WO | 2016028818 | A1 | 2/2016 |
| WO | 2016058681 | A1 | 4/2016 |
| WO | 2018041387 | A1 | 3/2018 |

OTHER PUBLICATIONS

Maryanka et al., "Truck-Trailer Redundant Powerline CAN Communication", Aug. 2012. 4 pages.
"VES Technology", Vehicle Enhancement Systems, Inc., Feb. 27, 2017. 3 pages.
"Trailer Tracking—Monitor the location, mileage and security of your trailers", FleetMind, Mar. 19, 2012. 2 pages.
"VES Technology", Vehicle Enhancement Systems, Inc., https://www.ves-systems.com/portfolio/technology/, retrieved from the internet on Feb. 27, 2020. 3 pages.
International Search Report from corresponding International Application No. PCT/US2021/019832 dated Jun. 17, 2021.

* cited by examiner

INTERFACE DEVICE INTERFACING TRACTOR AND TOWED UNIT NETWORKS IN A COMBINATION VEHICLE

TECHNICAL FIELD

The embodiments herein relate generally to interfaces for vehicles. More specifically, particular embodiments relate to devices and methods interfacing a control and communication network in a tractor of a combination vehicle with a control and communication network in one or more towed units such as trailers, dollies, and the like towed by the tractor. Although the embodiments will be described with reference to interface devices and methods in commercial highway vehicles having a Controller Area Network (CAN) bus in a tractor of a combination vehicle and a Power Line Communication (PLC) control and communication network in one or more towed units towed by the tractor for communicating messages in and among the networks, it is to be appreciated that the claimed invention is also amenable to other applications and can equivalently be extended to other embodiments and environments such as for example to automobiles towing trailers or any other vehicles having two or more different control and communication networks that might be benefited from an interface operating between the different networks.

BACKGROUND

Modern vehicles including for example construction vehicles, agricultural tractors, commercial highway vehicles, and many other similar work vehicles are controlled using multiple individual electronic controllers that are each arranged at suitable locations throughout the vehicle, and that are in operative communication with various sensor devices disposed at or locally near to the various operations that are performed by the vehicle. The multiple individual electronic controllers mutually communicate via a shared control and communication network such as CAN or the like.

Example operations performed by the multiple individual electronic controllers include a tire pressure monitoring operation performed by a Tire Pressure Monitoring System (TPMS) device using one or more pressure sensors at the tires, anti-lock braking operations performed by an Antilock Braking System (ABS) device using Wheel Speed Sensors (WSS) disposed near the wheels, traction control performed by an Automatic Traction Control (ATC) controller device, interfacing with the driver of the vehicle performed by one or more Driver Interface Units (DIUs) using display and input devices disposed in the cab of the vehicle, braking operations performed by a brake Electronic Control Unit (ECU), automatic emergency braking operations performed by an Automatic Emergency Braking System (AEBS), automatic cruise control operations performed by an Automatic Cruise Control (ACC) system, image recording operations performed by a camera of a video imaging system, and radar imaging operations performed by a RADAR system.

For performing these and other operations typical modern vehicles utilize one or more control and communication networks for communicating messages between the various electronic controllers. Command and control messages including command and control data may be used for effecting the operations, and performance and feedback messages including performance and feedback data may be used for communicating sensor data and the like for verifying that the command and control data is properly executed locally at the controlled operation.

Combination vehicles typically include a towing vehicle or tractor towing one or more towed units such as for example one or more trailers and/or one or more dollies. Modern tractors have various multiple individual electronic controllers that are arranged at suitable locations throughout the tractor chassis and that are in operative mutual communication via a tractor command and control network. An example is an antilock braking system (ABS) controller disposed in the towing vehicle wherein the ABS controller is in operative communication with other individual electronic controllers of the towing vehicle such as for example AEBS and ACC systems via a Controller Area Network (CAN) bus. Modern towed units also have various multiple individual electronic controllers such as for example one or more towed unit ABS (TABS) controllers disposed in the one or more towed vehicles, towed units, dollies, or trailers. Each of the one or more TABS controllers disposed in the one or more towed vehicles is responsible for controlling the application of air pressure braking commands received from the braking controller in the tractor. The TABS controllers operate by modulating the pneumatic pressure received from the tractor in order to better control the application of the brakes of the respective towed unit without local wheel lockup that might otherwise occur without the modulation, to best decelerate the overall combination vehicle in general. In addition, each of the one or more TABS controllers disposed in the one or more towed vehicles is capable of reporting its own operational status on the PLC control and communication network, and is also capable of responding to queries sent via the PLC network from one or more of the controllers of the towing vehicle such as for example towed unit identification request queries, or the like.

Commercial tractors typically use a CAN bus command and communication network for connecting the various multiple individual electronic controllers that are arranged at suitable locations throughout the tractor. However, to save on costs and for various other reasons, the towed units used with the commercial tractors typically use a PLC control and communication network for connecting the TABS controllers of the one or more towed units with the ABS and other controllers of the tractor. An electromechanical plug connection is typically provided at the rear of the tractor such as near to the tractor hitch or coupler system for physically selectively connecting the PLC network of the one or more towed units with a corresponding PLC network provided in the tractor and in communication with selected control units of the tractor. A J560 plug connector is commonly used in practice.

One problem, however, is that the PLC signals may weaken with the length the physical length of the network. The PLC signals originating from the towed units is strongest relative to the tractor boundaries, therefore, locally at the J560 connector. The additional distance for the signal to travel on the PLC network within the tractor chassis proper in order to reach the appropriate tractor electronic controller, can result in a further weakening or degradation of the signal resulting in a signal that ultimately might not be particularly useful to the ABS or other controllers in the tractor. For example, the ABS controller in the tractor on both the PLC network and the CAN bus of the tractor may be located about twelve (12) feet from the J560 plug connector, wherein substantial attenuation of the signal may occur within this span.

In addition, the TABS controllers in the one or more towed units may desire or need to report TABS controller health messages to the ABS or other controllers disposed in the tractor. A degradation of signals containing these messages by the extended length of the PLC network within the tractor chassis beyond the J560 plug connector may result in an error condition or in a failure of an ability of the ABS of other electronic controllers in the tractor to effectively and/or efficiently control the towed unit braking or to effectively and/or efficiently control other functions that may be performed by the TABS controllers such as for example an odometer tallying and reporting function.

In further addition, the TABS controllers in the one or more towed units may desire or need to report ABS fault messages to the ABS or other controllers disposed in the tractor. A degradation of signals containing these messages by the extended length of the PLC network within the tractor beyond the J560 plug connector may also result in an error condition or in a failure of an ability of the one or more electronic controllers in the tractor to effectively and/or efficiently control the towed unit braking.

In still addition, the TABS controllers in the one or more towed units may desire or need to report towed unit identification (ID) messages to the ABS or other controllers disposed in the tractor. A degradation of signals containing these messages by the extended length of the PLC network within the tractor beyond the J560 plug connector may further also result in an error condition or in a failure of an ability of the one or more electronic controllers in the tractor to effectively and/or efficiently count the number of towed units being towed by the tractor based on the reported towed unit IDs.

In yet still addition, the TABS controllers in the one or more towed units may desire or need to report towed unit identification (ID) messages to the ABS or other controllers disposed in the tractor. A degradation of signals containing these messages by the extended length of the PLC network within the tractor beyond the J560 plug connector may yet still further result in an error condition or in a failure of an ability of the one or more electronic controllers in the tractor to effectively and/or efficiently count the number of towed units being towed by the tractor based on a rate of receiving the reported towed unit IDs by the tractor.

It is therefore desirable to provide an interface device operatively coupling an associated ABS or other controller disposed in a towing vehicle with one or more associated TABS controllers disposed in one or more towed units towed by the towing vehicle for efficient communication and rebroadcasting of messages among and between the TABS controllers of the towed units and the ABS or other controllers of the towing vehicle.

It is therefore also desirable to provide an interface device operatively coupling a control and communication network disposed in a towing vehicle with a control and communication network disposed in one or more towed units towed by the towing vehicle for efficient communication and rebroadcasting of messages among and between the TABS controllers of the towed units on the control and communication network of the towed vehicles and the ABS or other controllers of the towing vehicle on the control and communication network of the towing vehicle.

SUMMARY OF THE EXAMPLE EMBODIMENTS

The embodiments herein provide for a new and improved interface device operatively coupling an associated ABS or other electronic controller disposed in a towing vehicle with associated one or more TABS controllers disposed in one or more towed units towed by the towing vehicle for efficient communication of messages among and between the ABS or other controllers and the one or more TABS controllers.

The embodiments herein further provide for a new and improved interface device operatively coupling a first control and communication network of one or more towed units of a combination vehicle with a second control and communication network of a towing vehicle of the combination vehicle for efficient communication of messages and data among and between the first and second control and communication networks.

The embodiments herein further provide for a new and improved interface device operatively coupling a first control and communication network of one or more towed units of a combination vehicle with a second control and communication network of a towing vehicle of the combination vehicle for conversion of the first messages to a format compatible with the second network for transmission of the first messages on the second control and communication network.

The embodiments herein further provide for a new and improved interface device operatively coupling a first control and communication network of one or more towed units of a combination vehicle with a second control and communication network of a towing vehicle of the combination vehicle for efficient processing of data contained in first messages received from the first control and communication network, and for transmission of the processed data as messages on the second control and communication networks.

In accordance an aspect, a device operatively couples an associated ABS or other controller disposed in a towing vehicle with associated one or more TABS controllers disposed in one or more towed units towed by the towing vehicle for efficient communication of messages between the TABS controllers and the ABS or other controllers. The control device includes a first interface circuit operatively coupled with a first control and communication network of the one or more towed units, a second interface circuit operatively coupled with a second control and communication network of the associated towing vehicle, a processor operatively coupled with the first and second interface circuits, a memory device operatively coupled with the processor, and logic stored in the memory device. The first interface circuit receives a first towed unit message from a TABS controller of the one or more towed units via the first control and communication network. The first towed unit message comprises first towed unit message data representative of a first towed unit status of the TABS controller of the one or more towed units. The logic is executable by the processor to convert the first towed unit message data to a first towed unit message compatible with the second control and communication network, and transmit the first towed unit message compatible with the second control and communication network to the second interface circuit. The logic is further executable by the processor to control the second interface circuit to transmit the first towed unit message compatible with the second control and communication network on the second control and communication network of the associated towing vehicle.

In accordance an aspect, the second control and communication network is different than the first control and communication network. In particular, in accordance an aspect, the first interface circuit in the one or more towed units is a Power Line Communication (PLC) interface configured to receive towed unit messages from the TABS controller(s) of the one or more towed units or towed units via an associated PLC control and communication network of the one or more towed units or towed units, and the second interface circuit is a Controller Area Network (CAN) interface in the tractor configured to transmit towed unit messages compatible with the second control and communication network on a CAN bus of the associated tractor towing vehicle.

Other embodiments, features and advantages of the example embodiments for operatively coupling an associated ABS controller disposed in a towing vehicle with an associated TABS controller disposed in one or more towed units towed by the towing vehicle for efficient communication of messages between the TABS controller and the ABS controller will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description reference is made to the accompanying Figures which form a part thereof, and in which is shown, by way of illustration, one or more example embodiments of the disclosed control device method and control device operatively coupling an associated automatic braking system (ABS) controller disposed in a tractor towing vehicle with an associated towed unit (TABS) controller disposed in one or more towed units such as trailers, dollies, etc. towed by the towing vehicle. Various modifications of the example embodiments may be contemplated by on of skill in the art.

Figure 1:
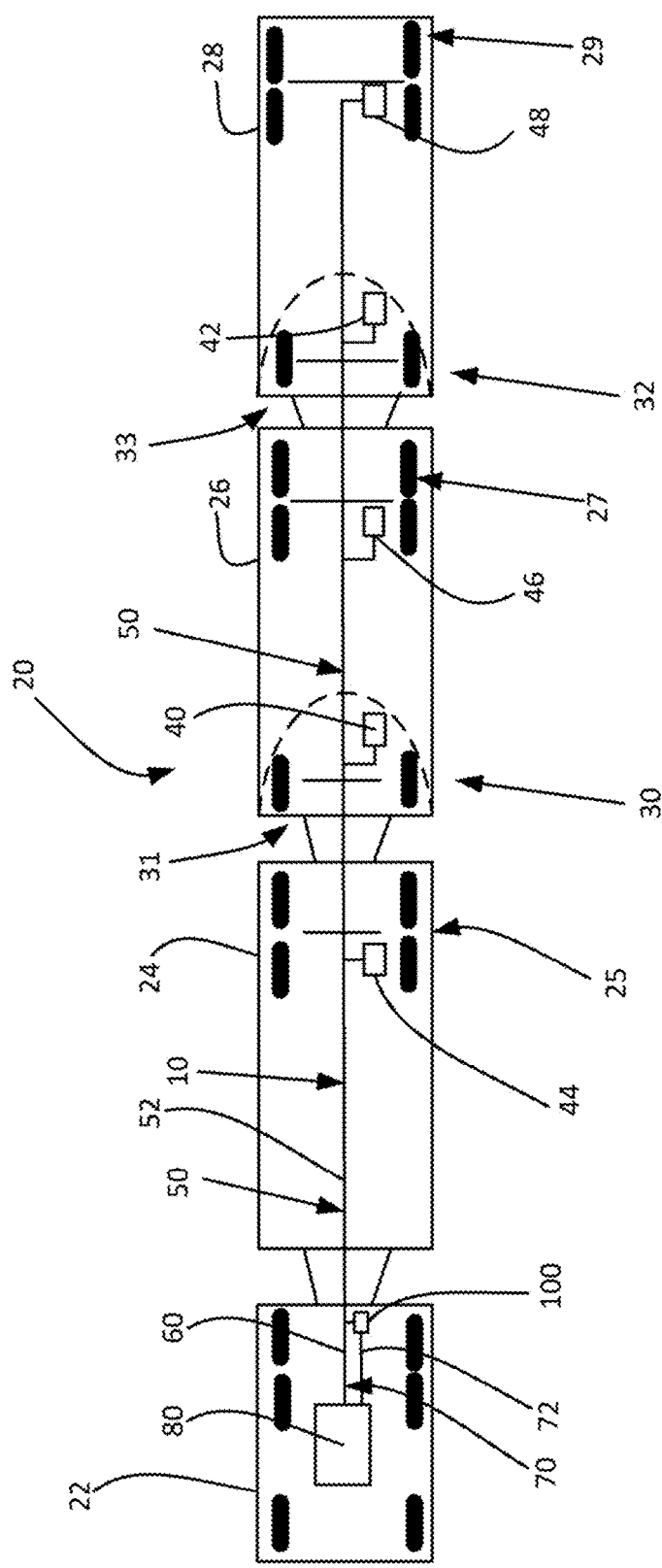
FIG. 1 is a diagrammatic showing of a control and communication system in a combination vehicle including a control device in accordance with an example embodiment.

Referring now to the drawings, wherein the showings are only for the purpose of illustrating the example embodiments only and not for purposes of limiting the same, FIG. 1 is a diagrammatic showing of a control and communication system 10 in a combination vehicle 20 including a device 100 in accordance with an example embodiment for interfacing different tractor and towed unit networks of a combination vehicle. Command, control, and other messages and/or data may be communicated among and between the different tractor and towed unit networks of a combination vehicle using the device 100 of the example embodiment. The formats of the command, control, and other messages and/or data may be converted as necessary and/or desired as they are communicated among and between the different tractor and towed unit networks of the combination vehicle using the device 100 of the example embodiment. In addition, the command, control, and other messages from the towed unit network may be converted if necessary or desired and transmitted onto the tractor network using the device 100 of the example embodiment, or the command, control, and other messages from the tractor network may be converted if necessary and transmitted onto the towed unit network using the device 100 of the example embodiment, or the command, control, and other messages from the towed unit network may be rebroadcast back onto the towed unit network using the device 100 of the example embodiment.

In the example embodiment, the combination vehicle 20 includes a towing vehicle or tractor 22, a first towed vehicle or towed unit 24, a second towed vehicle or towed unit 26, and a third towed vehicle or towed unit 28. The second towed unit 26 is coupled with the first towed unit 24 using a first dolly 30, and the third towed unit 28 is coupled with the second towed unit 26 using a second dolly 32. The first, second, and third towed units 24, 26, 28 may be trailers, for example. The combination vehicle of the example embodiment is known in the industry as a "triple." The device 100 is not limited to application in the combination vehicle illustrated, and can be used in any combination vehicle having any number of towed units such as trailers, dollies, or other devices or apparatus towed by the tractor, collectively herein "towed units" 24, 26, 28, 30, 32.

The tractor 22 includes a tractor command and control network 70 that is coupled with one or more controllers 80 disposed in the towing vehicle 22. The one or more controllers 80 of the tractor may include any type of controllers including for example a TPMS controller for performing a tire pressure monitoring operation, an ATC controller for performing a traction control operation, a DIU controller for providing driver interface operations, an ACC controller for providing automatic cruise control operations, a RADAR system for performing radar imaging operations, or the like. In the example embodiment, the controller 80 includes an ABS controller 82. Also in the example embodiment, the tractor command and control network 70 is a CAN bus command and control network 72 provided for exchanging signals between the various one or more controllers 80 of the tractor.

Each of the components of the towed unit portion of the combination vehicle 20 of the example embodiment in general includes an axle set having brakes and a TABS controller for modulating the air pressure delivered to the brakes from the tractor. In this regard, the first towed unit 24 has a first axle set 25 and a first TABS controller 44 for modulating the air pressure delivered to the brakes of the first axle set 25 to perform an antilock brake function at the first axle set. Similarly, the second towed unit 26 has a second axle set 27 and a second TABS controller 46, and the third towed unit 28 has a third axle set 29 and a third TABS controller 48. The second and third TABS controllers 46, 48 similarly perform antilock brake functions at their respective local axle sets 27, 29 by modulating the air pressure delivered from the tractor.

In addition in the example embodiment, the first dolly 30 has a first dolly axle set 31 and a first dolly TABS controller 40, and the second dolly 32 has a second dolly axle set 33 and a second dolly TABS controller 42. The first and second dolly TABS controllers 40, 42 similarly perform antilock brake functions at their respective local axle sets 31, 33 by modulating the air pressure delivered from the tractor.

Each of the one or more TABS controllers 40, 42, 44, 46, 48 disposed in the one or more towed units is responsible for controlling the application of braking commands received from the braking controller in the tractor in the form of air pressure. The TABS controllers 40, 42, 44, 46, 48 may act by modulating the pneumatic pressure received from the tractor in order to control the application of the brakes of their respective towed unit (trailer, dolly, etc.) without local wheel lockup, if possible, in order to best decelerate the overall combination vehicle in general.

Each of the TABS controllers 40, 42, 44, 46, 48 are mutually connected using a towed vehicle command and communication network 50. In the example embodiment, the towed vehicle command and communication network 50 is a PLC network 52. The PLC network 52 is coupled with the interface device 100 of the example embodiment using any suitable connector such as, for example, a J560 plug connector 60 disposed at the rear of the towing vehicle 22.

It is to be appreciated that the first dolly TABS controller 40 is responsive to queries and/or commands received from the one or more controllers 80 disposed in the towing vehicle 22 via the towed vehicle command and communication network 50 to perform selected operations or to provide information such as a TABS controller identification information, odometer reading information, or a health status information related specifically to the first dolly axle set 31 of the first dolly 30. Similarly, the second dolly TABS controller 42 is responsive to queries and/or commands received from the one or more controllers 80 disposed in the towing vehicle 22 via the towed vehicle command and communication network 50 to perform selected operations or to provide information such as a TABS controller identification information, odometer reading information, or a health status information related specifically to the second dolly axle set 33 of the second dolly 32.

It is further to be appreciated that the first TABS controller 44 is responsive to queries and/or commands received from the one or more controllers 80 disposed in the towing vehicle 22 via the towed vehicle command and communication network 50 to perform selected operations or to provide information such as a TABS controller identification information, odometer reading information, or a health status information related specifically to the first axle set 25 of the first towed unit 24, the second TABS controller 46 is responsive to queries and/or commands received from the one or more controllers 80 disposed in the towing vehicle 22 via the towed vehicle command and communication network 50 to perform selected operations or to provide information such as a TABS controller identification information, odometer reading information, or a health status information related specifically to the second axle set 27 of the second towed unit 26, and the third TABS controller 48 is responsive to queries and/or commands received from the one or more controllers 80 disposed in the towing vehicle 22 via the towed vehicle command and communication network 50 to perform selected operations or to provide information such as a TABS controller identification information, odometer reading information, or a health status information related specifically to the third axle set 29 of the third towed unit 28.

It is further to be appreciated that, in particular, the TABS controllers 40, 42, 44, 46, 48 are responsive to ABS health message queries received from the ABS controller 82 via the towed vehicle command and communication network 50 to generate and report back TABS controller health status messages on the towed vehicle command and communication network 50 including TABS health status data representative of the operational sufficiency of the respective TABS controllers 40, 42, 44, 46, 48.

It is still further to be appreciated that the TABS controllers 40, 42, 44, 46, 48 are operative to determine faults in the TABS controllers and to generate TABS controller fault messages including fault data representative of the determined faults, and to report the faults back to the ABS controller 82 of the towing vehicle via the towed vehicle command and communication network 50.

It is still yet further to be appreciated that the TABS controllers 40, 42, 44, 46, 48 are responsive to towed unit identification (ID) query messages received from the ABS controller 82 via the towed vehicle command and communication network 50 to generate and report back on the towed vehicle command and communication network 50 towed unit identification (ID) messages including ID data representative of the identification number of each of the towed units 24-29.

It is further to be appreciated that, in particular, the TABS controllers 40, 42, 44, 46, 48 are operable to selectively automatically generate and report on the towed vehicle command and communication network 50 TABS controller health status messages including TABS health status data representative of the operational sufficiency of the respective TABS controllers 40, 42, 44, 46, 48.

Figure 2:
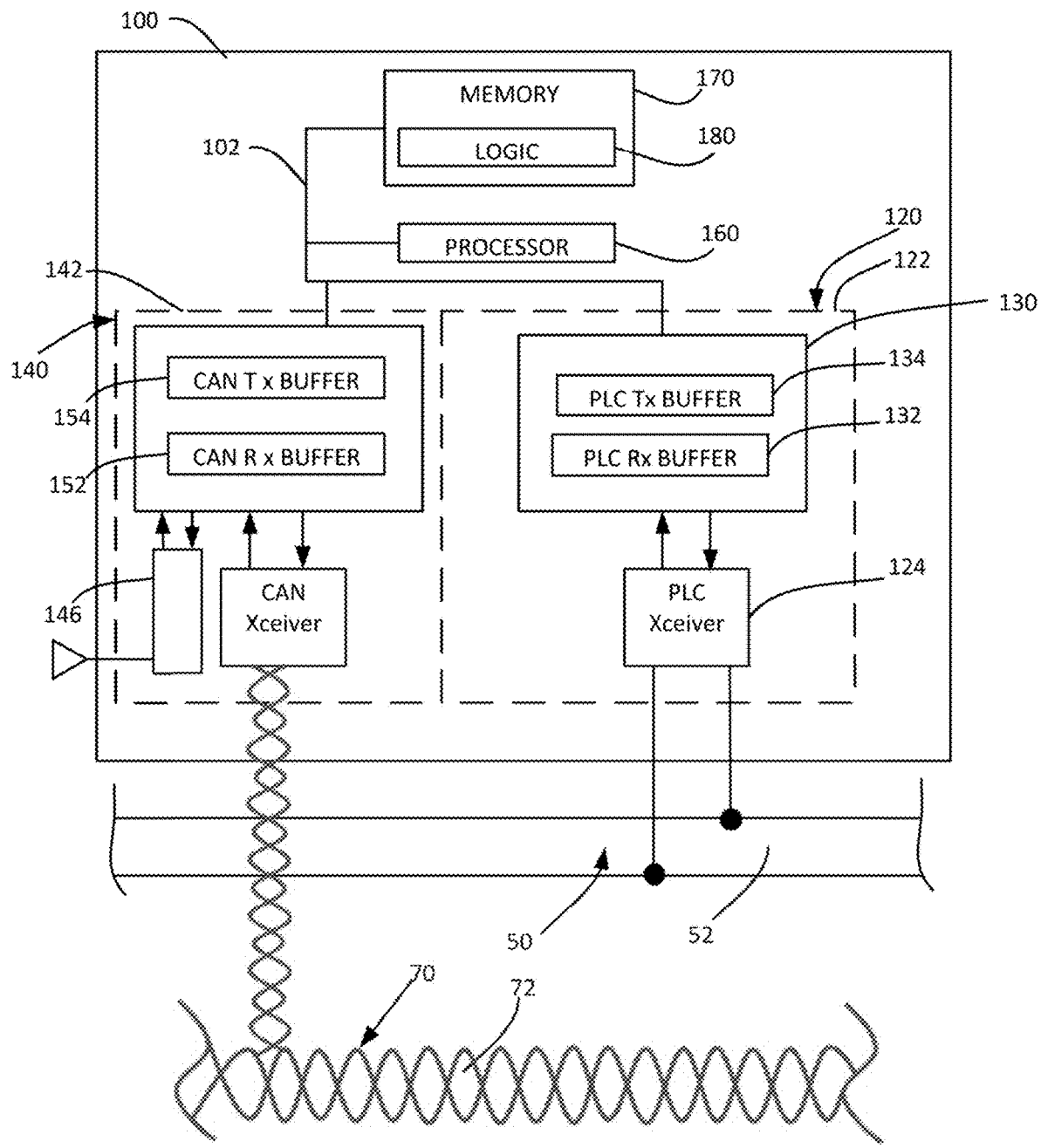
FIG. 2 is a schematic illustration of the control device of FIG. 1 in accordance with an example embodiment.

FIG. 2 is a schematic illustration of the control device 100 of FIG. 1 in accordance with an example embodiment. With reference now to that Figure, the control device 100 includes a first interface circuit 120 operatively coupled with the first control and communication network 50 of the towed units 24, 26, 28, 30, 32 a second interface circuit 140 operatively coupled with the tractor control and communication network 70 of the associated towing vehicle, a processor 160 operatively coupled via a bus 102 of the control device 100 with the first and second interface circuits 120, 140, a memory device 170 operatively coupled via the bus with the processor, and logic 180 stored in the memory device 170.

In general and in accordance with an example embodiment, the first interface circuit 120 is operable to receive a first towed unit message from one or more of the TABS controllers 44, 46, 48 of the one or more towed units 24, 26, 28 and/or from one or more of the TABS controllers 40, 42 of the one or more dollies 30, 32 via the control and communication network 50 of the towed units. The first towed unit message may include for example first towed unit message data representative of a first towed unit status of one or more of the TABS controllers 44, 46, 48 of the one or more towed units 24, 26, 28 and/or of a status of one or more the TABS controllers 40, 42 of the one or more dollies 30, 32.

Further in general and in accordance with an example embodiment, the logic 180 stored in the memory device 170 is executable by the processor 160 to convert the first towed unit message data to a first towed unit message compatible with the second control and communication network 70, transmit the first towed unit message compatible with the second control and communication network to the second interface circuit 140, and control the second interface circuit 140 to transmit the first towed unit message compatible with the second control and communication network 70 onto the second control and communication network 70 of the associated towing vehicle 22. By doing this, the control device 100 provides redundancy of messages received from the towed vehicles 24, 26, 28, 30, 32 wherein copies of the messages are forwarded onto the control and communication network 70 of the tractor 22.

Further in general and in accordance with an example embodiment, the logic 180 stored in the memory device 170 is executable by the processor 160 to receive a first towed unit message from one or more of the TABS controllers 44, 46, 48 of the one or more towed units 24, 26, 28 and/or from one or more of the TABS controllers 40, 42 of the one or more dollies 30, 32 via the towed unit control and communication network 50, and to control the first interface circuit 120 to retransmit the first towed unit message onto the control and communication network 50 of the towed units. Since this retransmission is at or near to the J560 plug connector 60 disposed at the rear of the towing vehicle 22, problems described above with regard to signal degradation within the chassis of the tractor are alleviated.

It is to be appreciated that the processor 160 may be any form of controller, micro-controller or the like, and that the interface circuits 120, 140 may be configured in general as CAN nodes and are typically connected with at least one other device (not shown) such as, for example, one or more sensor(s), one or more actuator(s), or some other control device. In addition and in accordance with the descriptions herein, the term "computer-readable medium" as may be used herein refers to any non-transitory media that stores and/or otherwise participates in providing instructions to the processor 160 for execution. Such a non-transitory medium may take many forms, including but not limited to volatile and non-volatile media. Non-volatile media includes, for example, memory devices, optical or magnetic disks, or the like. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures and claims, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

In an embodiment, the first interface circuit 120 is a Power Line Communication (PLC) interface 122 configured to receive the towed unit messages from the TABS controllers 40-48 of the one or more towed units and dollies via an associated PLC control and communication network 52 of the one or more towed units and dollies. In this regard, the Power Line Communication (PLC) interface 122 includes a PLC transceiver 124 for physically interfacing the Power Line Communication (PLC) interface 122 with the PLC network 52. The PLC transceiver 124 is operatively coupled with a communication buffer 130 including a PLC receive buffer 132 for placing messages into that were received from the Power Line Communication (PLC) interface 122, and a PLC transmit buffer 134 for placing messages into for transmitting onto the Power Line Communication (PLC) interface 122.

Also in the embodiment, the second interface circuit 140 is a Controller Area Network (CAN) interface 142 configured to transmit and receive messages compatible with the second control and communication network 70 on the CAN bus 72 of the associated towing vehicle 22. In this regard the Controller Area Network (CAN) interface 142 includes a CAN transceiver 144 for physically interfacing the Controller Area Network (CAN) interface 142 with the CAN network 72. The CAN transceiver 144 is operatively coupled with a communication buffer 150 including a CAN receive buffer 152 for placing messages into that were received from the Controller Area Network (CAN) interface 142, and a CAN transmit buffer 154 for placing messages into for transmitting onto the Controller Area Network (CAN) interface 142.

In the example embodiment, the logic 180 stored in the memory device 170 is executable by the processor 160 to convert first towed unit message data of a first towed unit message received in the PLC receive buffer 132 of the Power Line Communication (PLC) interface 122 via the PLC transceiver 124 to a first towed unit message compatible with the second control and communication network 70. This may involve adjusting some data fields or the like, or simply copying the message without any changes. The logic 180 is further executable by the processor to transmit the first towed unit message compatible with the second control and communication network to the second interface circuit 140, namely the Controller Area Network (CAN) interface 142. In the example embodiment, the message is delivered to the CAN transmit buffer 154 of the Controller Area Network (CAN) interface 142 for forwarding onto the CAN network 72. The logic 180 is further executable by the processor to control the Controller Area Network (CAN) interface 142 to transmit the first towed unit message compatible with the second control and communication network on the CAN network 72 of the associated towing vehicle. By doing this, the control device 100 provides redundancy of messages received from the towed vehicles 24, 26, 28, 30, 32 wherein copies of the messages are forwarded onto the control and communication network 70 of the tractor 22.

Further in the example embodiment, the logic 180 stored in the memory device 170 is executable by the processor 160 to retransmit the messages received from the PLC network 52 back onto the PLC network 52. Since this retransmission is at or near to the J560 plug connector 60 disposed at the rear of the towing vehicle 22, problems described above with regard to signal degradation within the chassis of the tractor are alleviated. In this regard, the logic 180 stored in the memory device 170 is executable by the processor 160 to copy the received message from the PLC receive buffer 132 to the PLC transmit buffer 134, and to control the Power Line Communication (PLC) interface 122 to retransmit the message from the PLC transmit buffer 134 back onto the PLC network 52.

Further in the example embodiment, the logic 180 stored in the memory device 170 is executable by the processor 160 to alter or otherwise modify the messages received from the PLC network 52 and to transmit the altered or modified messages back onto the PLC network 52. The altered or modified messages may also be transmitted onto the tractor CAN bus as well. The messages may include towed unit ID data representative of an identification of each of the towed units. In some cases, each of the messages includes towed unit ID data representative of a unique identification of each of the towed units. In other cases, the towed unit ID data contained in the messages are not unique to the towed units and may be duplicative. In still other cases, some of the towed unit ID data contained in the messages are unique to some of the towed units and other towed unit ID data contained in the messages may be duplicative. The logic may be executed to alter selected one or more of the messages to change one or more of the towed unit ID data to different towed unit ID data as may be necessary or desired. The altered messages having the modified or changed towed unit ID data may be transmitted onto the PLC interface 122 and/or transmitted onto the tractor CAN bus 72.

Further in the example embodiment, the logic 180 stored in the memory device 170 is executable by the processor 160 to determine a number or quantity of towed units connected with the tractor 22 based on message rates of messages sent from the towed units 24, 26, 28, 30, 32 on the PLC network 52. In this regard, the first interface circuit 120 operates to receive a plurality of first towed unit messages from the TABS controllers 40-48 of the one or more towed units the via the first control and communication network 50 at a first message rate. The messages sent from the towed units 24, 26, 28, 30, 32 on the PLC network 52 may be initiated based on a query sent from the ABS controller 82 or any other controller in the tractor command and control network 70, they may be initiated from a query generated directly by the control device 100, or they may be automatically generated and sent without the need for a prompt or query. The logic 180 stored in the memory device 170 is executable by the processor 160 determine, from the message rate of the received message, a quantity of towed units of the one or more towed units. The logic further generates towed unit quantity data representative of the determined quantity of towed units, convert the towed unit quantity data to a towed unit quantity message compatible with the second control and communication network 70, transmit the towed unit quantity message compatible with the second control and communication network to the second interface circuit, and controls the second interface circuit 140 to transmit the towed unit quantity message compatible with the second control and communication network on the second control and communication network 70 of the associated towing vehicle. The control device 100 may place the determined number of towed units as data into a message stored in the CAN transmit buffer 154 for transmission onto the CAN bus 72.

Further in the example embodiment, the logic 180 stored in the memory device 170 is executable by the processor 160 to determine a number or quantity of towed units connected with the tractor 22 based towed unit identification (ID) messages sent from the towed units 24, 26, 28, 30, 32 on the PLC network 52. In this regard, the first interface circuit 120 operates to receive a plurality of first towed unit messages from the TABS controllers 40-48 of the one or more towed units the via the first control and communication network 50, wherein each of the messages includes towed unit ID data representative of an identification of each of the towed units. In some cases, each of the messages includes towed unit ID data representative of a unique identification of each of the towed units. In other cases, the towed unit ID data contained in the messages are not unique to the towed units and may be duplicative. In still other cases, some of the towed unit ID data contained in the messages are unique to some of the towed units and other towed unit ID data contained in the messages may be duplicative. The messages sent from the towed units 24, 26, 28, 30, 32 on the PLC network 52 may be initiated based on a query sent from the ABS controller 82 or any other controller in the tractor command and control network 70, they may be initiated from a query generated directly by the control device 100, or they may be automatically generated and sent without the need for a prompt or query. The logic 180 stored in the memory device 170 is executable by the processor 160 determine, from the ID data contained in the received messages, a quantity of towed units of the one or more towed units. The logic may be executed to tally the duplicative towed unit ID data in the aggregate, and to count the towed unit ID data that is unique to the towed units individually. The logic further generates towed unit quantity data representative of the determined quantity of towed units, converts the towed unit quantity data to a towed unit quantity message compatible with the second control and communication network 70, transmits the towed unit quantity message compatible with the second control and communication network to the second interface circuit, and controls the second interface circuit 140 to transmit the towed unit quantity message compatible with the second control and communication network on the second control and communication network 70 of the associated towing vehicle. The control device 100 may place the determined number of towed units as data into a message stored in the CAN transmit buffer 154 for transmission onto the CAN bus 72.

Further in the example embodiment, the logic 180 stored in the memory device 170 is executable by the processor 160 to determine a health status of the TABS controllers of the towed vehicles based on towed unit health status messages sent from the towed units 24, 26, 28, 30, 32 on the PLC network 52. In this regard, the first interface circuit 120 operates to receive a plurality of first towed unit health status messages from the TABS controllers 40-48 of the one or more towed units the via the first control and communication network 50, wherein each of the towed unit health status messages includes towed unit health status data representative of a health status of each of the towed units. The messages sent from the towed units 24, 26, 28, 30, 32 on the PLC network 52 may be initiated based on a query sent from the ABS controller 82 or any other controller in the tractor command and control network 70, they may be initiated from a query generated directly by the control device 100, or they may be automatically generated and sent without the need for a prompt or query. The logic 180 stored in the memory device 170 is executable by the processor 160 determine, from the health status data contained in the received messages, an overall health status of the towed units. The logic further generates towed unit health status data representative of the determined towed unit health status, converts the towed unit health status data to a towed unit health status message compatible with the second control and communication network 70, transmits the towed unit health status message compatible with the second control and communication network to the second interface circuit, and controls the second interface circuit 140 to transmit the towed unit health status message compatible with the second control and communication network on the second control and communication network 70 of the associated towing vehicle. The control device 100 may place the determined towed unit health status as data into a message stored in the CAN transmit buffer 154 for transmission onto the CAN bus 72.

The control device 100 of the example embodiment acts in general as a bridge or message "amplifier" between a control and communication network 50 of towed united vehicles and any other control and communication network as may be necessary or desired including and as described above for amplifying messages back onto the control and communication network 50 of towed united vehicles. As described, the control device 100 of the example embodiment is configured to interface or interact in general as a bridge or message "amplifier" between a PLC network 52 of the towed united vehicles and a CAN network 72 of the tractor. In addition, the control device includes a wireless transmitter circuit 146 including an antenna 148 for transmitting messages stored in the transmit buffer 152 wirelessly to any similarly equipped wireless transceiver. In this regard, the second interface circuit 140 comprises a wireless communication network interface 146 configured to transmit towed unit messages on a wireless communication network (not shown).

The control device 100 may receive messages on the PLC network 52 and wirelessly transmit the received messages via the wireless communication network interface 146 onto the wireless communication network. Similarly, the control device 100 may receive messages on the CAN network 72 and wirelessly transmit the received messages via the wireless communication network interface 146 onto the wireless communication network. Similarly, the control device 100 may receive messages on the wireless communication network interface 146 and transmit the received messages via the Power Line Communication (PLC) interface 122 onto PLC network 52 or via the Controller Area Network (CAN) interface 142 onto the CAN network 72.

Figure 3A:
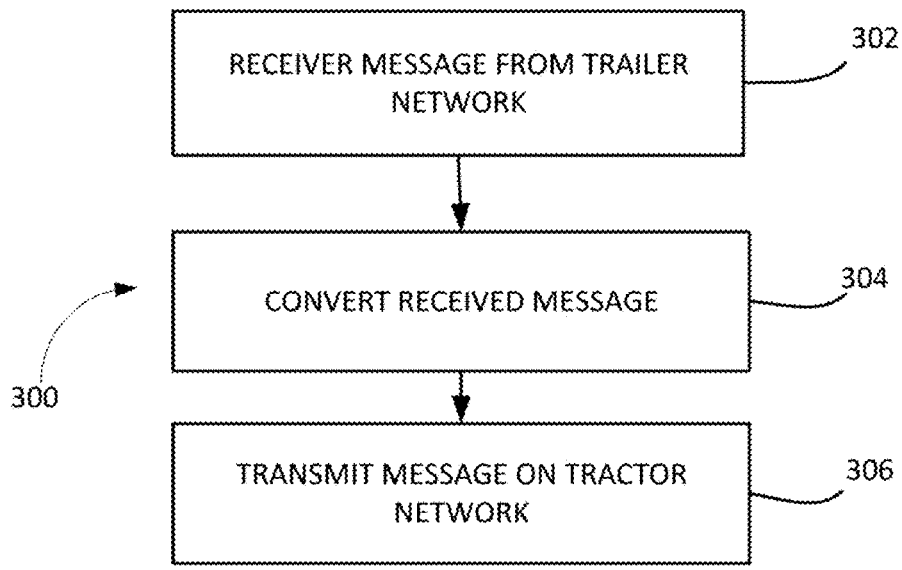
FIGS. 3a and 3b are flow diagrams illustrating methods of operating the control device in accordance with an embodiment.
Figure 3B:
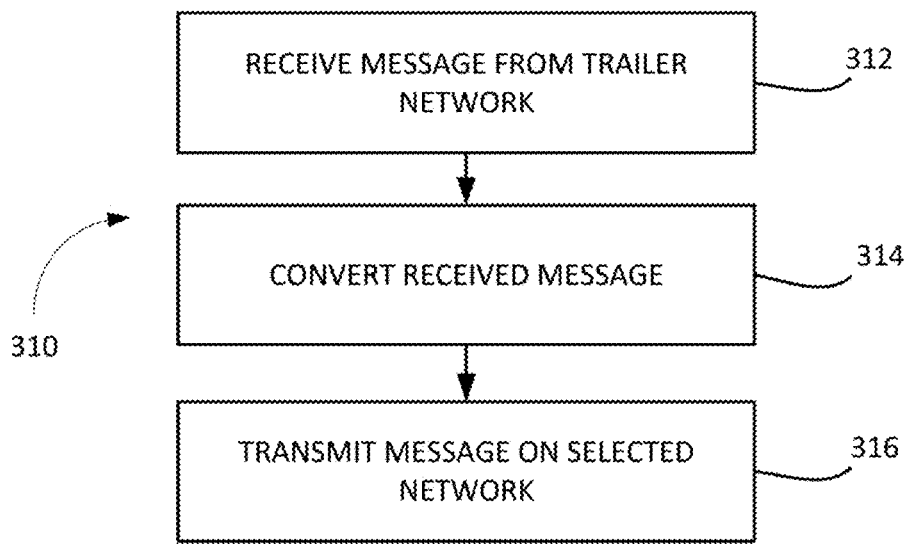

FIGS. 3*a* and 3*b* are flow diagrams illustrating methods of operating the control device in accordance with an embodiment. In general and in accordance with an example embodiment of a method 300 in FIG. 3*a*, in step 302, the first interface circuit 120 is operable to receive a first towed unit message from one or more of the TABS controllers 44, 46, 48 of the one or more towed units 24, 26, 28 and/or from one or more of the TABS controllers 40, 42 of the one or more dollies 30, 32 via the control and communication network 50 of the towed units. The first towed unit message may include for example first towed unit message data representative of a first towed unit status of one or more of the TABS controllers 44, 46, 48 of the one or more towed units 24, 26, 28 and/or of a status of one or more the TABS controllers 40, 42 of the one or more dollies 30, 32.

Further in general and in accordance with an example embodiment, the logic 180 stored in the memory device 170 is executable by the processor 160 to convert in step 304 the first towed unit message data to a first towed unit message compatible with the second control and communication network 70. This may involve adjusting some data fields or the like, or simply copying the message without any changes. The logic 180 stored in the memory device 170 is executable by the processor 160 to transmit the first towed unit message compatible with the second control and communication network to the second interface circuit 140, and control the second interface circuit 140 to transmit in step 306 the first towed unit message compatible with the second control and communication network 70 onto the second control and communication network 70 of the associated towing vehicle 22. By doing this, the control device 100 provides redundancy of messages received from the towed vehicles 24, 26, 28, 30, 32 wherein copies of the messages are forwarded onto the control and communication network 70 of the tractor 22.

In general and in accordance with an example embodiment of a method 310 in FIG. 3*b*, in step 312, the first interface circuit 120 is operable to receive a first towed unit message from one or more of the TABS controllers 44, 46, 48 of the one or more towed units 24, 26, 28 and/or from one or more of the TABS controllers 40, 42 of the one or more dollies 30, 32 via the control and communication network 50 of the towed units. The first towed unit message may include for example first towed unit message data representative of a first towed unit status of one or more of the TABS controllers 44, 46, 48 of the one or more towed units 24, 26, 28 and/or of a status of one or more the TABS controllers 40, 42 of the one or more dollies 30, 32.

Further in general and in accordance with an example embodiment, the logic 180 stored in the memory device 170 is executable by the processor 160 to convert in step 314 the first towed unit message data to a first towed unit message compatible with a selected second control and communication network 70, 50 or any network such as for example a wireless network. This may involve adjusting some data fields or the like, or simply copying the message without any changes. The logic 180 stored in the memory device 170 is executable by the processor 160 to transmit the first towed unit message compatible with the second control and communication network to the second interface circuit 140, and control the second interface circuit 140 to transmit in step 316 the first towed unit message compatible with the selected second control and communication network 70, 50 or wireless, onto the selected second control and communication network 70, 50 or wireless network. By doing this, the control device 100 provides redundancy of messages received from the towed vehicles 24, 26, 28, 30, 32 wherein copies of the messages are forwarded onto a selected second control and communication network 70, 50 or wireless.

Figure 4:
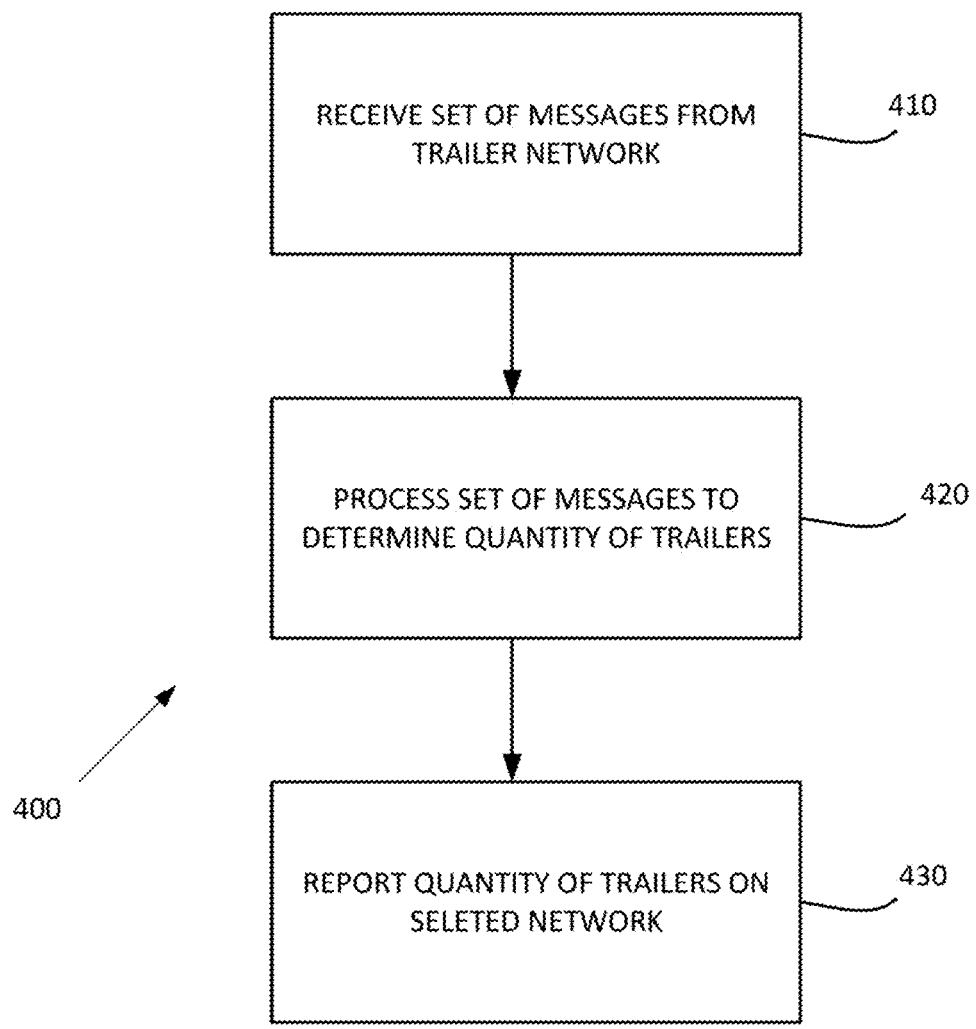
FIG. 4 is a flow diagram illustrating a method of operating the control device in accordance with an embodiment.

FIG. 4 is a flow diagram illustrating a method 400 of operating the control device in accordance with an embodiment. The logic 180 stored in the memory device 170 is executable by the processor 160 to determine a number or quantity of towed units connected with the tractor 22 based on message rates of messages sent from the towed units 24, 26, 28, 30, 32 on the PLC network 52. In this regard, the first interface circuit 120 may operate to receive in step 410 a plurality of first towed unit messages from the TABS controllers 40-48 of the one or more towed units the via the first control and communication network 50 at a first message rate. The messages sent from the towed units 24, 26, 28, 30, 32 on the PLC network 52 may be initiated based on a query sent from the ABS controller 82 (510, 520, FIG. 5) or any other controller in the tractor command and control network 70, they may be initiated from a query generated directly by the control device 100, or they may be automatically generated and sent without the need for a prompt or query. The logic 180 stored in the memory device 170 is executable by the processor 160 determine in step 420, from the message rate of the received message, a quantity of towed units of the one or more towed units. The logic further generates towed unit quantity data representative of the determined quantity of towed units, convert the towed unit quantity data to a towed unit quantity message compatible with the second control and communication network 70, transmit in step 430 the towed unit quantity message compatible with the second control and communication network to the second interface circuit, and controls the second interface circuit 140 to transmit the towed unit quantity message compatible with the second control and communication network on the second control and communication network 70 of the associated towing vehicle. The control device 100 may place the determined number of towed units as data into a message stored in the CAN transmit buffer 154 for transmission onto the CAN bus 72.

Alternatively the logic 180 stored in the memory device 170 is executable by the processor 160 to determine a number or quantity of towed units connected with the tractor 22 based towed unit identification (ID) messages sent from the towed units 24, 26, 28, 30, 32 on the PLC network 52. In this regard, the first interface circuit 120 operates to receive in step 410 a plurality of first towed unit messages from the TABS controllers 40-48 of the one or more towed units the via the first control and communication network 50, wherein each of the messages includes towed unit ID data representative of an identification of each of the towed units. In some cases, each of the messages includes towed unit ID data representative of a unique identification of each of the towed units. In other cases, the towed unit ID data contained in the messages are not unique to the towed units and may be duplicative. In still other cases, some of the towed unit ID data contained in the messages are unique to some of the towed units and other towed unit ID data contained in the messages may be duplicative. The messages sent from the towed units 24, 26, 28, 30, 32 on the PLC network 52 may be initiated based on a query developed in step 510 (FIG. 5) sent in step 520 (FIG. 5) from the ABS controller 82 or any other controller in the tractor command and control network 70, they may be initiated from a query generated directly by the control device 100, or they may be automatically generated and sent without the need for a prompt or query. The logic 180 stored in the memory device 170 is executable by the processor 160 determine in step 420, from the ID data contained in the received messages, a quantity of towed units of the one or more towed units. The logic may be executed to tally the duplicative towed unit ID data in the aggregate, and to count the towed unit ID data that is unique to the towed units individually. The logic further generates towed unit quantity data representative of the determined quantity of towed units, converts the towed unit quantity data to a towed unit quantity message compatible with the second control and communication network 70, transmits the towed unit quantity message compatible with the second control and communication network to the second interface circuit, and controls the second interface circuit 140 to transmit in step 430 the towed unit quantity message compatible with the second control and communication network on the second control and communication network 70 of the associated towing vehicle. The control device 100 may place the determined number of towed units as data into a message stored in the CAN transmit buffer 154 for transmission onto the CAN bus 72.

Figure 5:
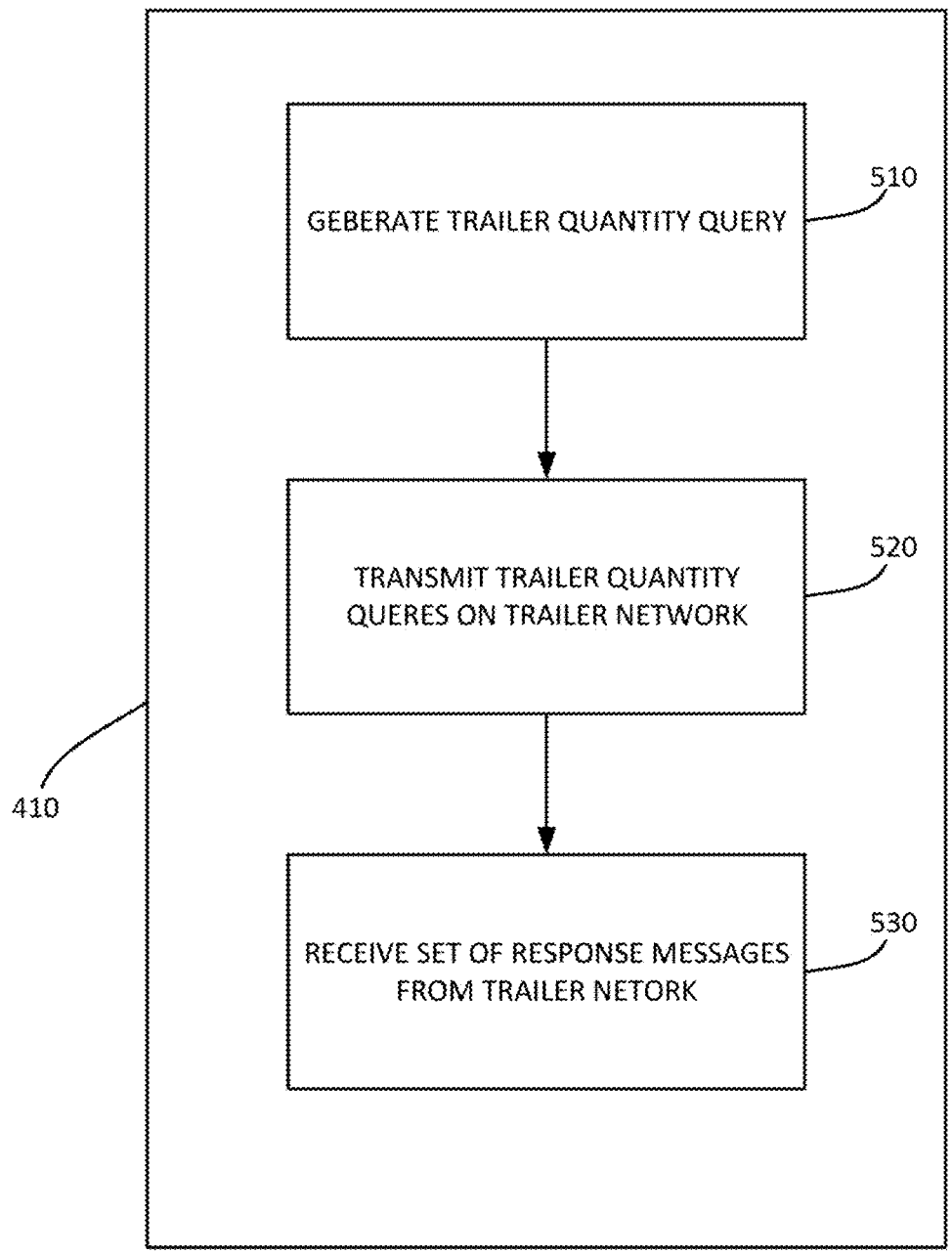
FIG. 5 is a flow diagram illustrating a method of operating the control device in accordance with a step in the method of FIG. 4 in accordance with an embodiment.

FIG. 5 is a flow diagram illustrating a method of operating the control device in accordance with a step in the method of FIG. 4 in accordance with an embodiment. The logic 180 stored in the memory device 170 is executable by the processor 160 to generate a towed unit quantity query in step 510 and to transmit the towed unit quantity query on the towed unit network 50 in step 520. The first interface circuit 120 may operate to receive in step 530 a plurality of first towed unit messages from the TABS controllers 40-48 of the one or more towed units the via the first control and communication network 50 at a first message rate and/or having towed unit ID information embedded therein. The messages sent from the towed units 24, 26, 28, 30, 32 on the PLC network 52 may therefore be initiated in step 410 based on the query sent from the ABS controller 82 (510, 520, FIG. 5) or from any other controller in the tractor command and control network 70, they may be initiated from a query generated directly by the control device 100, or they may be automatically generated and sent without the need for a prompt or query.

Figure 6:
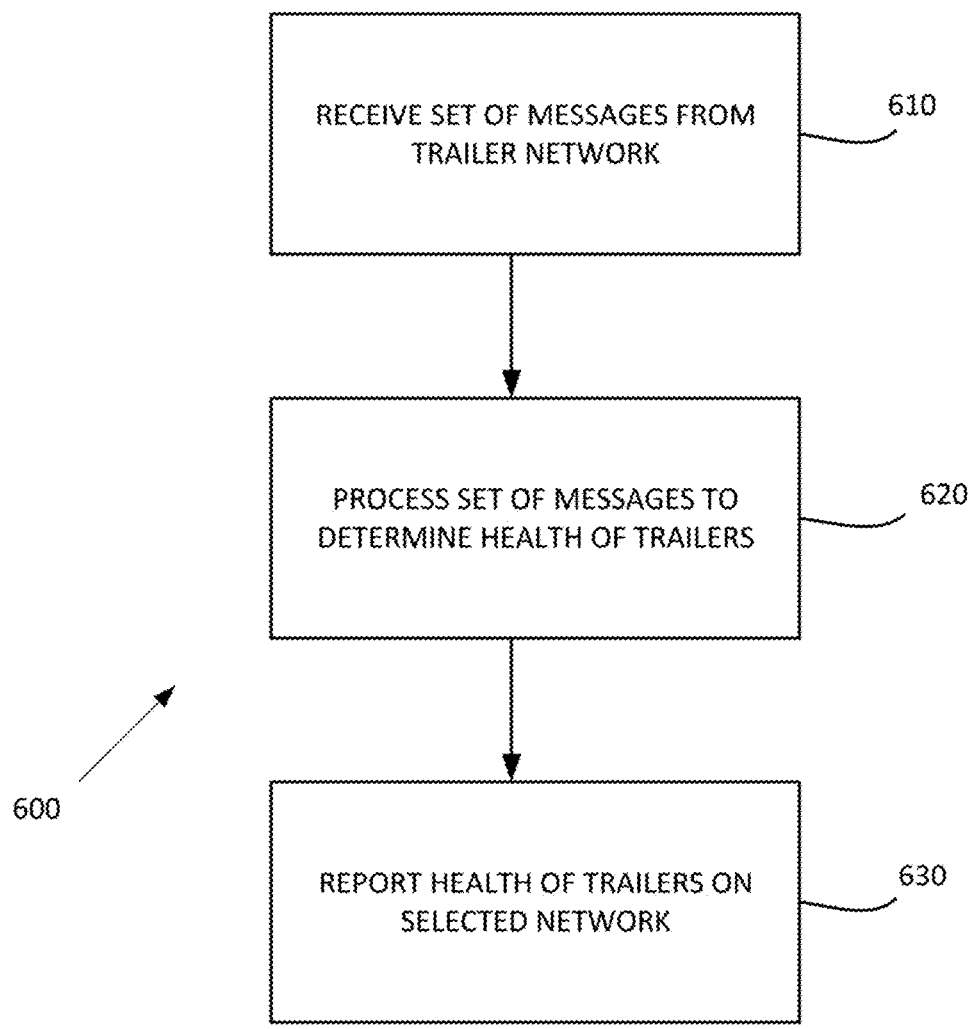
FIG. 6 is a flow diagram illustrating a method of operating the control device in accordance with an embodiment.

FIG. 6 is a flow diagram illustrating a method 600 of operating the control device in accordance with an embodiment With reference now to the Figure, the first interface circuit operates in step 610 to receive a plurality of first towed unit messages from the one or more associated towed unit controllers of the one or more towed units the via the first control and communication network. In the example embodiment, each of the plurality of first towed unit messages comprises health status data representative of a health status of a one or the one or more associated towed unit controllers of one or more towed units.

In step 620, the logic stored in the memory device is executable by the processor to determine from the health status data of the plurality of first towed unit messages an overall health status of the one or more associated towed unit controllers of one or more towed units, generate overall health status data representative of the determined overall health status of the one or more associated towed unit controllers of one or more towed units quantity of towed units, and convert the overall health status data to an overall health status message compatible with the second control and communication network.

In step 630, the logic stored in the memory device is executable by the processor to report the health status of the towed units on a selected network by transmitting the overall health status message compatible with the second control and communication network to the second interface circuit, and control the second interface circuit to transmit the overall health status message compatible with the second control and communication network on the second control and communication network of the associated towing vehicle.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

It is claimed:

1. An interface device operatively coupling an associated first control and communication network of one or more towed units of an associated combination vehicle with an associated second control and communication network of an associated towing vehicle of the associated combination vehicle towing the one or more towed units, the interface device comprising:

a first interface circuit operatively coupled with the first control and communication network of the one or more towed units, the first interface circuit receiving a plurality of towed unit messages from one or more associated towed unit controllers of the one or more towed units via the first control and communication network at a first message rate, the plurality of towed unit messages comprising a first towed unit message comprising first towed unit message data representative of a first towed unit status of the one or more associated towed unit controllers disposed in the one or more towed units;

a second interface circuit operatively coupled with the second control and communication network of the towing vehicle, wherein the second control and communication network is different than the first control and communication network;

a processor operatively coupled with the first and second interface circuits;

a memory device operatively coupled with the processor; and logic stored in the memory device, the logic being executable by the processor to:
   determine, from the first message rate, a quantity of towed units of the one or more towed units;
   generate towed unit quantity data representative of the determined quantity of towed units;
   convert the first towed unit message data of the first towed unit message to a towed unit status message compatible with the second control and communication network;
   convert the towed unit quantity data to a towed unit quantity message compatible with the second control and communication network;
   transmit the towed unit status message and the towed unit quantity message to the second interface circuit; and
   control the second interface circuit to transmit the towed unit status message and the towed unit quantity message on the second control and communication network of the associated towing vehicle.

2. The interface device according to claim 1, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a Controller Area Network (CAN) interface circuit configured to transmit the towed unit status message and the towed unit quantity message on an associated CAN bus of the associated towing vehicle.

3. The interface device according to claim 1, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a wireless communication network interface circuit configured to transmit the towed unit status message and the towed unit quantity message on an associated wireless communication network.

4. The interface device according to claim 1, wherein:
the logic stored in the memory device is executable by the processor to:
control the first interface circuit to re-transmit one or more of the plurality of towed unit messages on the first control and communication network of the associated one or more towed units.

5. An interface device operatively coupling an associated first control and communication network of one or more towed units of an associated combination vehicle with an associated second control and communication network of an associated towing vehicle of the associated combination vehicle towing the one or more towed units, the interface device comprising:
   a first interface circuit operatively coupled with the first control and communication network of the one or more towed units, the first interface circuit receiving a plurality of towed unit messages from one or more associated towed unit controllers of the one or more towed units via the first control and communication network, wherein each of the plurality of towed unit messages comprises identification (ID) data representative of a unique identification of the one or more towed units;
   a second interface circuit operatively coupled with the second control and communication network of the towing vehicle, wherein the second control and communication network is different than the first control and communication network;
   a processor operatively coupled with the first and second interface circuits;
   a memory device operatively coupled with the processor; and
   logic stored in the memory device, the logic being executable by the processor to:
      determine, from the identification (ID) data representative of the unique identification of the one or more towed units, a quantity of towed units of the one or more towed units;
      generate towed unit quantity data representative of the determined quantity of towed units;
      convert the towed unit quantity data to a towed unit quantity message compatible with the second control and communication network;
      transmit the towed unit quantity message compatible with the second control and communication network to the second interface circuit; and
      control the second interface circuit to transmit the towed unit quantity message on the second control and communication network of the associated towing vehicle.

6. The interface device according to claim 5, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a Controller Area Network (CAN) interface circuit configured to transmit the converted towed unit message on an associated CAN bus of the associated towing vehicle.

7. The interface device according to claim 5, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a wireless communication network interface circuit configured to transmit the converted towed unit message on an associated wireless communication network.

8. The interface device according to claim 5, wherein:
the logic stored in the memory device is executable by the processor to:
control the first interface circuit to re-transmit one or more of the plurality of towed unit messages on the first control and communication network of the associated one or more towed units.

9. An interface device operatively coupling an associated first control and communication network of one or more towed units of an associated combination vehicle with an associated second control and communication network of an associated towing vehicle of the associated combination vehicle towing the one or more towed units, the interface device comprising:
- a first interface circuit operatively coupled with the first control and communication network of the one or more towed units, the first interface circuit receiving a plurality of towed unit messages from one or more associated towed unit controllers of the one or more towed units via the first control and communication network, wherein each of the plurality of towed unit messages comprises health status data representative of a health status of a one or more of the associated towed unit controllers of one or more towed units;
- a second interface circuit operatively coupled with the second control and communication network of the towing vehicle, wherein the second control and communication network is different than the first control and communication network;
- a processor operatively coupled with the first and second interface circuits;
- a memory device operatively coupled with the processor; and
- logic stored in the memory device, the logic being executable by the processor to:
  - determine, from the health status data of the plurality of towed unit messages, an overall health status of the one or more associated towed unit controllers of one or more towed units;
  - generate overall health status data representative of the determined overall health status of the one or more associated towed unit controllers of one or more towed units quantity of towed units;
  - convert the overall health status data to an overall health status message compatible with the second control and communication network;
  - transmit the overall health status message compatible with the second control and communication network to the second interface circuit; and
  - control the second interface circuit to transmit the overall health status message on the second control and communication network of the associated towing vehicle.

10. The interface device according to claim 9, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a Controller Area Network (CAN) interface circuit configured to transmit the converted towed unit message compatible with the second control and communication network on a CAN bus of the associated towing vehicle.

11. The interface device according to claim 9, wherein:
the first interface circuit comprises a Power Line Communication (PLC) interface circuit configured to receive the plurality of towed unit messages from the one or more associated towed unit controllers of the one or more towed units via an associated PLC control and communication network of the one or more towed units; and
the second interface circuit comprises a wireless communication network interface circuit configured to transmit the converted towed unit message compatible with the second control and communication network on a wireless communication network.

12. The interface device according to claim 9, wherein:
the logic stored in the memory device is executable by the processor to:
control the first interface circuit to re-transmit one or more of the plurality of towed unit messages on the first control and communication network of the associated one or more towed units.

13. A method of interfacing an associated first control and communication network of one or more towed units of an associated combination vehicle with an associated second control and communication network of an associated towing vehicle of the associated combination vehicle towing the one or more towed units, the method comprising:
- receiving by a first interface circuit operatively coupled with the first control and communication network of the one or more towed units a plurality of towed unit messages from one or more associated towed unit controllers of the one or more towed units via the first control and communication network at a first message rate, the plurality of towed unit messages comprising a first towed unit message comprising first towed unit message data representative of a first towed unit status of the one or more associated towed unit controllers disposed in the one or more towed units;
- determining, from the first message rate, a quantity of towed units of the one or more towed units;
- generating towed unit quantity data representative of the determined quantity of towed units;
- converting the first towed unit message data of the first towed unit message to a towed unit status message compatible with the second control and communication network;
- converting the towed unit quantity data to a towed unit quantity message compatible with the second control and communication network;
- transmitting the towed unit status message and the towed unit quantity message to a second interface circuit operatively coupled with the second control and communication network of the towing vehicle, wherein the second control and communication network is different than the first control and communication network; and
- transmitting by the second interface circuit the towed unit status message and the towed unit quantity message on the second control and communication network of the associated towing vehicle.

14. The method according to claim 13, wherein:
the receiving the first towed unit message comprises receiving the plurality of towed unit messages by a Power Line Communication (PLC) interface circuit configured to receive the plurality of first towed unit messages from the one or more associated towed unit controllers of the one or more towed units via an associated PLC control and communication network of the one or more towed units; and
the transmitting the converted towed unit message compatible with the second control and communication network comprises transmitting the towed unit status message by a Controller Area Network (CAN) interface circuit configured to transmit the towed status unit message on a CAN bus of the associated towing vehicle.

15. The method according to claim 13, wherein:
the receiving the first towed unit message comprises receiving the plurality of towed unit messages by a Power Line Communication (PLC) interface circuit configured to receive the plurality of towed unit messages from the one or more associated towed unit controllers of the one or more towed units via an associated PLC control and communication network of the one or more towed units; and the transmitting the towed unit status message comprises transmitting the towed unit status message by a wireless communication network interface circuit configured to transmit the towed unit status message on a wireless communication network.

16. The method according to claim 13, further comprising:
retransmitting one or more of the plurality of first towed unit message comprising the first towed unit message data on the first control and communication network of the associated one or more towed units.

17. A method of interfacing an associated first control and communication network of one or more towed units of an associated combination vehicle with an associated second control and communication network of an associated towing vehicle of the associated combination vehicle towing the one or more towed units, the method comprising:
receiving by a first interface circuit operatively coupled with the first control and communication network of the one or more towed units a plurality of first towed unit messages from one or more associated towed unit controllers of the one or more towed units via the first control and communication network, wherein each of the plurality of first towed unit messages comprises identification (ID) data representative of a unique identification of the one or more towed units; and
executing logic stored in a memory device of an interface device by a processor to:
determine, from the identification (ID) data representative of the unique identification of one or more towed units, a quantity of towed units of the one or more towed units;
generate towed unit quantity data representative of the determined quantity of towed units;
convert the towed unit quantity data to a towed unit quantity message compatible with the second control and communication network;
transmit the towed unit quantity message compatible with the second control and communication network to a second interface circuit operatively coupled with the second control and communication network of the towing vehicle, wherein the second control and communication network is different than the first control and communication network; and
control the second interface circuit to transmit the towed unit quantity message compatible with the second control and communication network on the second control and communication network of the associated towing vehicle.

18. A method of interfacing an associated first control and communication network of one or more towed units of an associated combination vehicle with an associated second control and communication network of an associated towing vehicle of the associated combination vehicle towing the one or more towed units, the method comprising:
receiving by a first interface circuit operatively coupled with the first control and communication network of the one or more towed units a plurality of first towed unit messages from one or more associated towed unit controllers of the one or more towed units via the first control and communication network, wherein each of the plurality of first towed unit messages comprises health status data representative of a health status of a one or the one or more associated towed unit controllers of one or more towed units; and
executing logic stored in a memory device of an interface device by a processor to:
determine, from the health status data of the plurality of first towed unit messages, an overall health status of the one or more associated towed unit controllers of one or more towed units;
generate overall health status data representative of the determined overall health status of the one or more associated towed unit controllers of one or more towed units quantity of towed units;
convert the overall health status data to an overall health status message compatible with the second control and communication network;
transmit the overall health status message compatible with the second control and communication network to a second interface circuit operatively coupled with the second control and communication network of the towing vehicle, wherein the second control and communication network is different than the first control and communication network; and
control the second interface circuit to transmit the overall health status message compatible with the second control and communication network on the second control and communication network of the associated towing vehicle.

19. An interface device operatively coupling an associated first control and communication network of one or more towed units of an associated combination vehicle with an associated second control and communication network of an associated towing vehicle of the associated combination vehicle towing the one or more towed units, the interface device comprising:
a first interface circuit operatively coupled with the first control and communication network of the one or more towed units, the first interface circuit receiving a plurality of towed unit messages from one or more associated towed unit controllers of the one or more towed units via the first control and communication network at a first message rate;
a second interface circuit operatively coupled with the second control and communication network of the towing vehicle, wherein the second control and communication network is different than the first control and communication network;
a processor operatively coupled with the first and second interface circuits;
a memory device operatively coupled with the processor; and
logic stored in the memory device, the logic being executable by the processor to:
determine, from the first message rate, a quantity of towed units of the one or more towed units;
generate towed unit quantity data representative of the determined quantity of towed units;
convert the towed unit quantity data to a towed unit quantity message compatible with the second control and communication network;
transmit the towed unit quantity message to the second interface circuit; and
control the second interface circuit to transmit the towed unit quantity message on the second control and communication network of the associated towing vehicle.

20. A method of interfacing an associated first control and communication network of one or more towed units of an associated combination vehicle with an associated second control and communication network of an associated towing vehicle of the associated combination vehicle towing the one or more towed units, the method comprising:
- receiving by a first interface circuit operatively coupled with the first control and communication network of the one or more towed units a plurality of first towed unit messages from the one or more associated towed unit controllers of the one or more towed units at a first message rate; and
- executing logic stored in a memory device of an interface device by a processor to:
  - determine, from the first message rate, a quantity of towed units of the one or more towed units;
  - generate towed unit quantity data representative of the determined quantity of towed units;
  - convert the towed unit quantity data to a towed unit quantity message compatible with the second control and communication network;
  - transmit the towed unit quantity message compatible with the second control and communication network to a second interface circuit operatively coupled with the second control and communication network of the towing vehicle, wherein the second control and communication network is different than the first control and communication network; and
  - control the second interface circuit to transmit the towed unit quantity message compatible with the second control and communication network on the second control and communication network of the associated towing vehicle.

* * * * *